Patented June 22, 1954

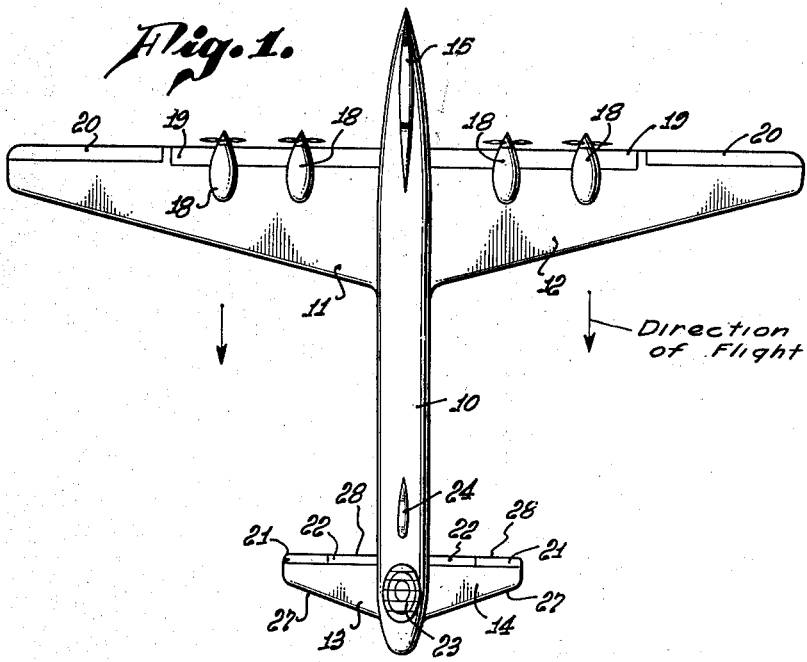
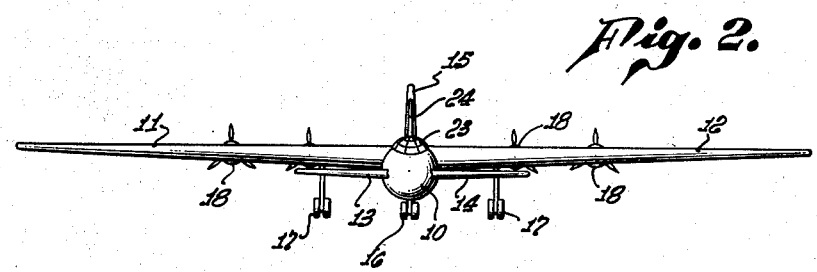
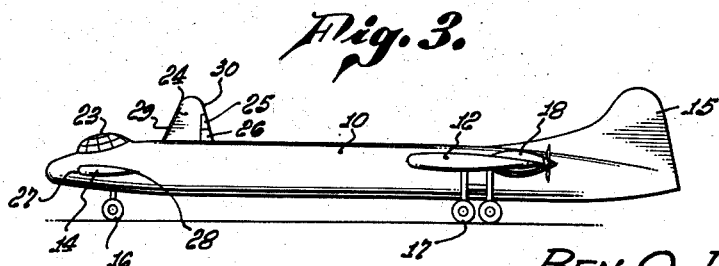

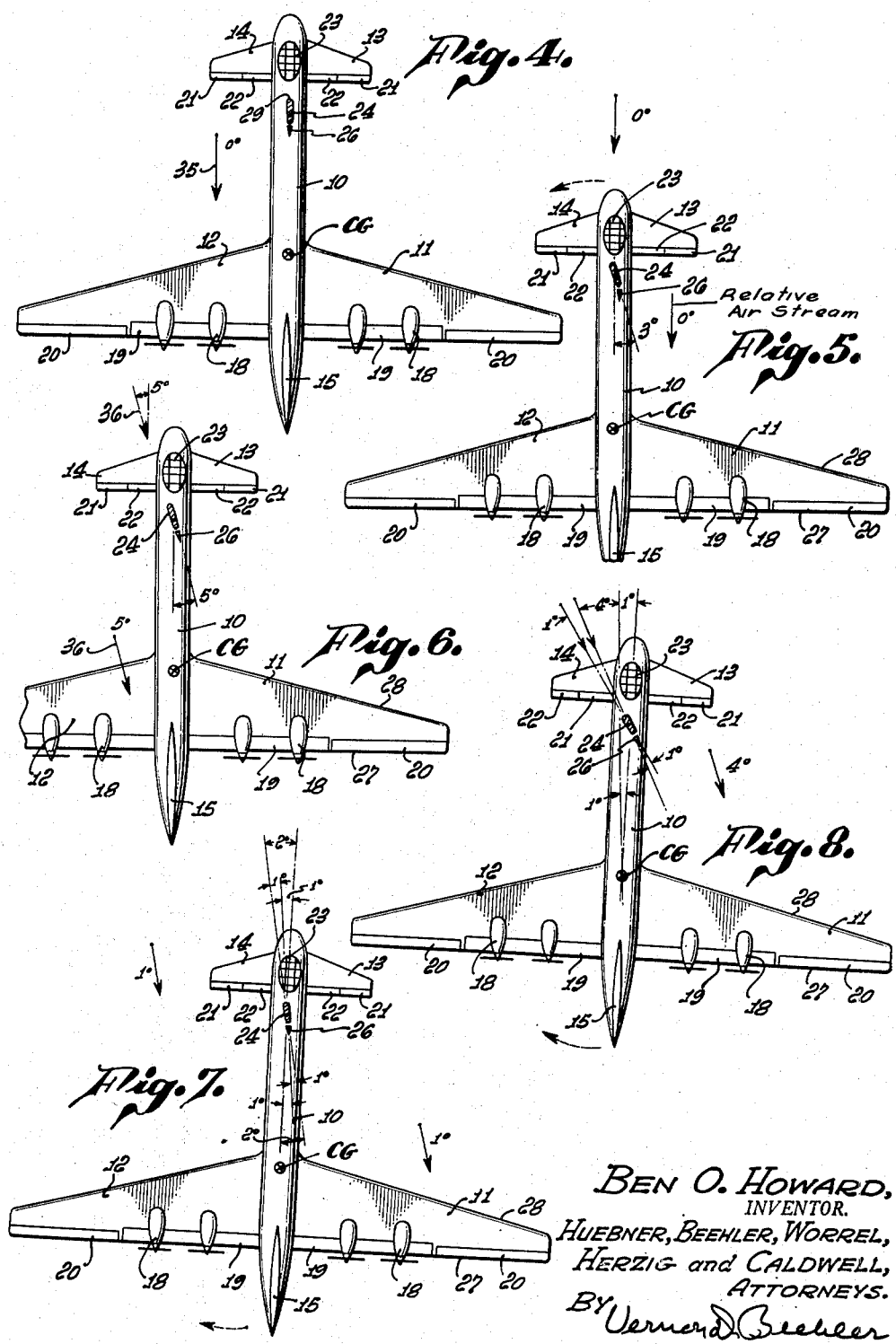

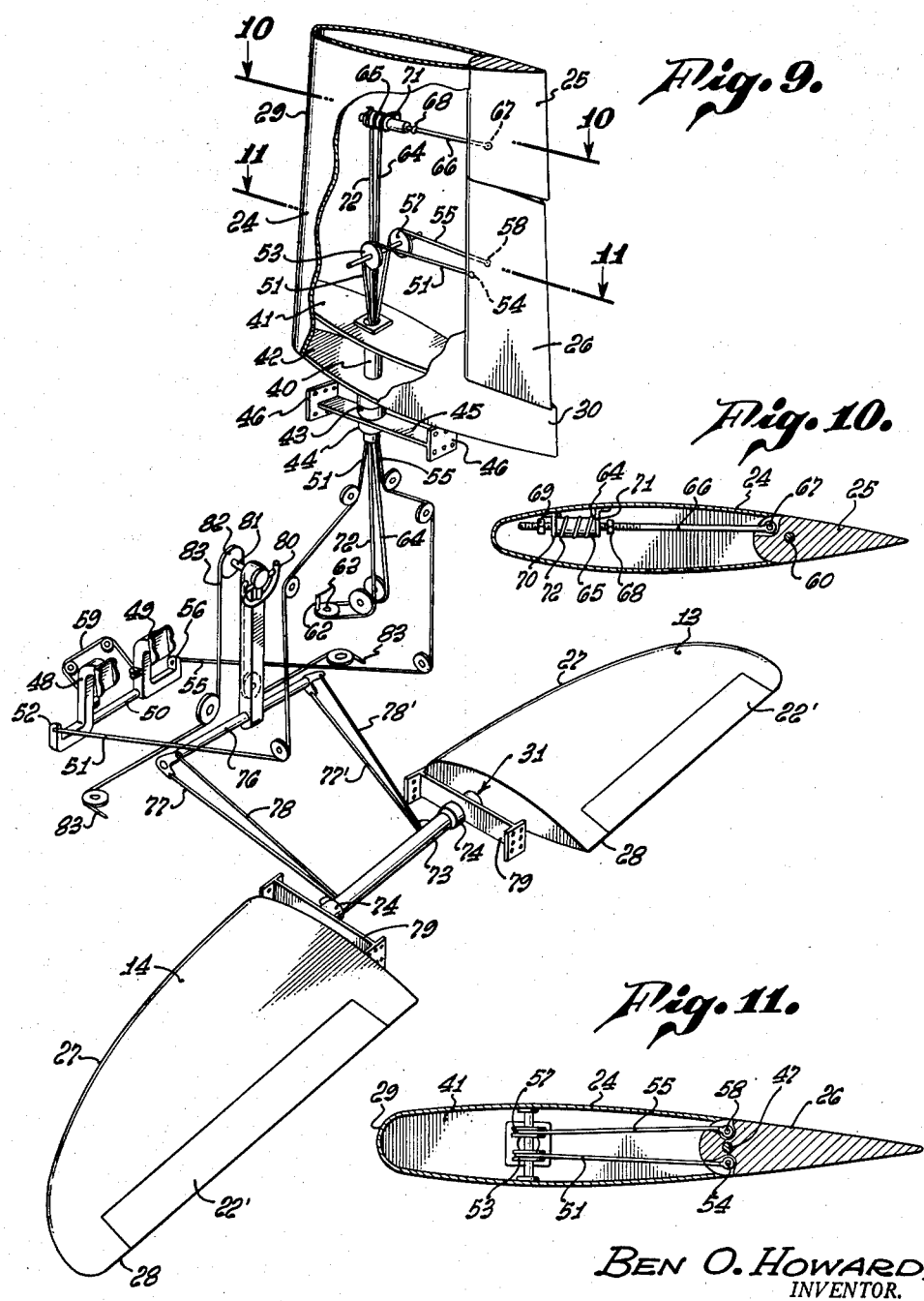

2,681,776

UNITED STATES PATENT OFFICE 2,681,776

FLOATING RUDDER FOR AIRCRAFT

Ben O. Howard, Hagerstown, Md.

Application July 8, 1950, Serial No. 172,735

12 Claims. (Cl. 244—45)

1

The invention relates to aircraft and more particularly to a rudder or directional control for airplanes and dirigibles. While the rudder or directional control of the invention may on occasions be considered as a substitute for a conventional rudder device and possessed of general adaptability, it is more especially advantageous for use with airplanes commonly designated as a tandem type or Canard type airplane wherein the lift of main wings located aft of the center of gravity is assisted by the lift of forward wings well in advance of the center of gravity.

In airplanes of conventional design wherein the empennage section is located aft of the main wings, the rudder surface must ordinarily be made large in order to supply sufficient lateral thrust to be certain to turn the airplane under all conditions. In a tandem type or Canard type airplane use of a conventional aft located rudder would be disadvantageous partly because of its size. More particularly utilization of forward horizontal auxiliary wing surfaces far in advance of the center of gravity provides a convenient mounting platform for a forwardly located rudder. Therefore, since the auxiliary wing surfaces are already forward, to locate the rudder aft would add unnecessarily to the structure of the airplane by requiring provision of a rear extension or tail for the sole purpose of mounting the rudder.

It is therefore among the objects of the invention to provide a new and improved rudder or directional control for airplanes or other appropriate aircraft which is more positive in its response than those heretofore employed.

Another object of the invention is to provide a new and improved rudder or directional control for airplanes or other aircraft which embodies a free floating vertically disposed airfoil adapted to direct itself into the air stream and which is controlled by manipulation of one or more control tabs at the trailing edge of the airfoil.

Another object is to provide a new and improved directional control for airplanes which is particularly well adapted for installation at the forward end of the airplane and well in advance of the center of gravity and one wherein the surface area of an airfoil providing the directional control can be held to a minimum.

Still another object of the invention is to provide a new and improved directional control for airplanes or other aircraft which can be located near the forward end of the airplane or aircraft and thereby permit greater latitude in the location of the center of gravity and which is more readily responsive to trim and control effort than conventional types of directional controls.

Still another object of the invention is to provide a new and improved floating rudder which can be located near the forward end of the aircraft and used either as the sole directional control or as auxiliary to a conventional rudder located aft.

Still further among the objects of the invention is to provide a floating type rudder controllable by tabs only located on the trailing edge and adaptable for use in a tandem type airplane having forward lifting surfaces or wing sections extending horizontally outwardly and to provide a rudder which is capable of minimizing the undesirable directional effect of thermal currents, gusts or bumps which normally cause yawing of the airplane.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a plan view of a tandem type airplane on which the invention is incorporated.

Figure 2 is a front view of the airplane.

Figure 3 is a side elevational view.

Figures 4, 5, 6, 7 and 8 are plan views with the floating rudder shown schematically in different positions of adjustment for different flying conditions.

Figure 9 is a schematic view of the floating rudder or directional control showing its relationship to a horizontal floating wing section, together with necessary pilot controls and connections thereto.

Figure 10 is a cross-sectional view through the trim tab taken on the line 10—10 of Figure 9.

Figure 11 is a cross-sectional view of the control tab taken on the line 11—11 of Figure 9.

One of the advantages of a tandem type or Canard type airplane is a construction permitting the provision of forward lifting surfaces located well in advance of the center of gravity in contrast to a main wing section located aft of the center of gravity so that all of the lift on the wing surfaces tends to support the load. Although tandem type airplanes can be constructed with forward floating wings so disposed that they provide direction control as well as vertical lift, as described in detail in my copending application, Serial No. 161,440, filed May 11, 1950, occasions may arise where substantially horizontally disposed forward lifting surfaces may be more advantageous. Forward lifting surfaces of the horizontal type can provide no directional control which therefore must be supplied by some other means. To carry forward the advantages achieved by use of a tandem type airplane it is desirable to provide a rudder or directional control also located well in advance of the center of gravity so that a desired directional moment about the center of gravity can be readily created by an airfoil of relatively small surface. Although a floating rudder or directional control may be adapted to a wide variety of uses including employment on aircraft such as dirigibiles, it is illustrated in the present invention in connection with a tandem type airplane.

Accordingly there is shown in Figures 1, 2 and 3 a tandem type airplane having an elongated fuselage 10 with a main wing section comprising wings 11 and 12 located well toward the rear of the fuselage and a forward wing section comprising floating wings 13 and 14 located near the forward end of the airplane. Aft of the main wings is a stationary vertical fin 15 supplementing that portion of the airplane generally considered as the vertical keel area. A forward landing gear 16 is shown near the nose of the airplane and a rear landing gear 17 is located beneath the main wings. On the main wings are engines 18 here illustrated as pusher type engines and on the main wings are also flaps 19 and ailerons 20 adapted to operate in the conventional manner. The floating wings are provided with trim tabs 21 and control tabs 22. Because of the employment of the floating wings the fuselage 10 is adapted to extend well forward of the main wings and need not extend any substantial distance aft of the main wings except to provide a vertical keel area to stabilize and balance the craft directionally.

Located near the forward end of the fuselage 10 is a pilot cockpit 23. A floating rudder or directional control 24 may be conveniently located to the rear of the pilot cockpit and the rudder, as illustrated, is provided with a trim tab 25 and control tab 26.

As shown in Figures 1, 2 and 3 the floating forward wings 13 and 14 are adapted to be so mounted with respect to the fuselage that they are free for unrestricted rotation throughout all flying positions about a horizontal axis located intermediate a leading edge 27 and a trailing edge 28 so that a positive lift may be applied to the floating wings and transferred to the fuselage. A torque tube assembly 31 may be employed to connect the floating wings to the fuselage and provide thereby a passageway through which a system of pilot operated controls may extend to the tabs 21 and 22 so that the tabs can be set at an angle with respect to the wings to give the wings a desired lifting effect.

The vertical floating rudder 24 is also mounted upon a pivotal connection and secured thereby to the fuselage 10 so that the axis of the pivotal connection lies intermediate a leading edge 29 and a trailing edge 30 of the floating rudder. The mounting and operation of this portion of the device is shown in greater detail in Figure 9.

To illustrate the advantages of a directional control consisting of a floating rudder of the type herein described, attention is directed to the schematic study illustrated in Figures 4, 5, 6, 7 and 8. Figure 4 shows a tandem type airplane of the same general description as Figure 1 with the floating rudder 24 in longitudinal alignment with the fuselage 10. When in horizontal alignment the control tab 26 is in alignment with the floating rudder. In the description of Figure 4 and the figures immediately following, reference will be made primarily to the control tab 26 and its effect upon the manipulation and course of the airplane but it will be understood that so far as aerodynamic forces are concerned the effect of operation of the trim tab 25 and the control tab 26 are substantially the same.

In Figure 4 it may be assumed that the airplane is in flight with the motors 18 all in operation driving the airplane forward at a rate of speed sufficient to maintain flight so that the relative air stream is directly in line with the direction of the airplane as indicated by an arrow 35. It will be noted further in the schematic representations that the center of gravity indicated by the reference character CG is located somewhat in advance of the center of lift of the main wings 11 and 12 and that the distance between the center of lift of the floating wings 13 and 14 and the center of gravity is substantially greater than the distance between the center of lift of the main wings and the center of gravity. The lifting area on the small wings, which are the floating wings, can therefore be correspondingly less than the area of the main wings.

The vertical fin 15 is located aft of the center of gravity and is of sufficient size to cause the aerodynamic center of pressure of the total aerodynamic vertical keel to be aft of the center of gravity. The vertical keel area may be assumed to comprise fuselage portions aft of the center of gravity in company with the fin 15. The vertical keel aerodynamic center of pressure is always aft of the center of gravity in order to maintain directional stability. A floating rudder small in area is therefore sufficient to adequately control the direction of the airplane.

As previously noted for a flight dead ahead the floating rudder 24 and tab 26 are aligned as illustrated in Figure 4. In this position the control tabs 22 on the floating wings may be manipulated to nose the airplane up to an ascending attitude or to nose the airplane down to a descending attitude without affecting the control exercised upon the airplane by the floating rudder. Under the same circumstances the trim tabs 21 on the floating wings may also be operated as well as the ailerons 20 and flaps 19 on the main wings.

When it is desired to turn the airplane toward the left, the control tab 26 on the floating rudder is manipulated so that it assumes an angle with respect to the floating rudder 24 in the direction indicated in Figure 5, namely, so that the angle formed between the tab and the floating rudder opens toward the left. In the example illustrated it is assumed that the tab has been turned to a 3-degree angle in the direction indicated. This setting will cause the floating rudder to pivot about its axis in the air stream so that it makes approximately the same angle of 3 degrees with respect to the direction of the air stream and also momentarily with respect to the fuselage. The result of this angular disposition of the floating rudder is to create a lateral thrust toward the left upon the floating rudder which causes the nose of the airplane to be moved toward the left as viewed from the pilot's seat and as depicted by the dotted arrow in Figure 5. Due to the fact that the engines continue to thrust the airplane forward, the airplane will continue to turn toward the left as long as the tab is maintained in the described angular position with respect to the floating rudder. After the airplane has been turned sufficiently far, the tab 26 may be straightened into aligned position, namely, the rudder and tab positions illustrated in Figure 4, whereupon the airplane will be forced ahead on the new course.

During the turning movement while there exists a lateral thrust upon the floating rudder 24 due to its being turned in relation to the direction of the air stream, there will be relatively little lateral thrust upon the vertical fin 15 or no more than enough to balance the airplane about the center of gravity.

For a right turn the tab 26 is cocked angularly with respect to the floating rudder in an opposite direction resulting in rotation of the floating rudder toward the right to create a lateral thrust toward the right as the airplane is driven forward.

If during normal flight there should be a gust of wind from the left as illustrated in Figure 6, action of the floating rudder will again come into play in a manner preventing the forcing of the airplane off course toward the rght as would ordinarily be the case. Assuming the gust to be directed against the airplane 5 degrees from the left of the longidudinal axis, the gust will have the direction of the arrow 36. Under those circumstances the air stream will force the vertical rudder 24 to weathercock into the inflow of air which means that the floating rudder will be deflected 5 degrees with respect to the longitudinal axis of the airplane under circumstances where the tab 26 remains in alignment with the rudder.

Assuming for the purpose of illustration that the trim tab is also set in alignment with the rudder, there will be no lateral thrust against the rudder at the forward end of the airplane due to the change in direction of the wind. The wind force, however, is felt upon the fuselage of the airplane and also upon the vertical fin 15. Although there may be some tendency for the wind to swing the nose of the airplane toward the right due to a gust approaching from the left, at the same time the lateral thrust of the gust upon the vertical fin is toward the right and at a location rearwardly of the center of gravity and this is sufficient to counter-balance the effect of the wind on the fuselage forward so that the direction of the airplane remains substantially the same, thus minimizing tendency of the gust to buffet the airplane normally off course or causing it to yaw. If the gust should be of long duration the airplane will nose around directly into the new direction of the air stream and continue straight in the new direction. When the gust stops the situation becomes reversed and the airplane initially tending to fly 5 degrees toward the left is brought back into straight flight in the previous direction. This is brought about because with the cessation of the gust the effect is much the same as a 5-degree change in the wind toward the right, causing the floating rudder to weathercock toward the right. The airplane will then turn toward the right in the same general manner as it did when the gust arose and will eventually align itself again in the position illustrated in Figure 4.

Because of the tendency of the floating rudder to minimize the effect of sudden gusts of wind upon the direction of the airplane, an airplane thus equipped with a floating rudder has a considerable advantage over conventional airplanes during take-off and landing where the effect of a sudden gust of wind in one direction or another would have a greater tendency to throw the airplane off course to such an extent that the landing or take-off might become hazardous.

In the schematic representation of Figure 7 it may be assumed that there is an unbalanced power thrust due to a failure of one of the engines 18 on the right side of the airplane. Since both engines on the left may be assumed to continue to operate there will be a tendency in flight to turn the airplane toward the right. For the purpose of explanation it will be assumed that the airplane is then trimmed by manipulation of the control tab 26 rather than the trim tab and in which event the trim indicated as needed is a 2-degree trim of the rudder directionally toward the left, to counter-balance the tendency of the unbalanced power to thrust the airplane directionally toward the right. This is brought about by rotating the tab 26 clockwise as viewed from above.

In the condition described the floating rudder will be cocked 2 degrees toward the left whereupon there will be a lateral thrust upon the floating rudder tending to resist the right turn resulting from the unbalanced power thrust and tending to push the forward or nose end of the airplane leftward. Where the airplane has been turned toward the right by the unbalanced effect of the engines, the floating rudder will be turned approximately 2 degrees toward the left with respect to the longitudinal axis or center line of the airplane.

After the initial adjustment just described the airplane will be stabilized in a 1 degree crab to the left. That is, the rear of the airplane will be shifted toward the left but the longitudinal center line will be rotated 1 degree in a clockwise direction as viewed from above and as illustrated in Figure 7. This is the position represented schematically in Figure 7. In this position the air will be impinging upon the fin 15 at a 1 degree angle, the result of which will be a force on the fin pushing it toward the right. The force on the rudder will at the same time push the nose of the airplane toward the left and these two forces acting about the center of gravity will tend to rotate the airplane counter-clockwise to counter-balance the unsymmetrical power thrust which tends to rotate the airplane clockwise.

In the stabilized condition last described the tab angle is reduced to 1 degree from 2 degrees and the angle of the rudder to the air will be 1 degree toward the left. This is true even though the rudder is rotated 2 degrees toward the left from the longitudinal center line of the airplane, because of the rear of the airplane being crabbed 1 degree toward the left. The net result is that the airplane as a whole continues on its true course but with the longitudinal center line cocked 1 degree from a direction dead ahead.

It will become apparent from the foregoing explanation that even though there be a considerable unbalance in the power thrust a relatively slight trim of the control tabs 26 is all that is necessary in order to trim the airplane so that it will continue its course straight ahead.

Assuming the 1-degree stabilized trim given to the airplane as described in connection with Figure 7 the reaction of the airplane to a 4-degree gust approaching the airplane from the left is of assistance in understanding the characteristics of an airplane equipped with the floating directional control. Under such circumstances the lateral thrust on the vertical fin 15 will be increased by an amount corresponding to the increase in the angular direction of the relative air stream. The relative positions of the airplane, rudder and direction of air stream are illustrated by way of example in Figure 8. As there depicted the change in direction of the relative air stream upon the floating rudder 24 will cause the rudder to weathercock into the air stream so that it assumes the same direction with respect to the air stream coming from the new direction as it did with the air stream coming from the direction shown in Figure 7. Under the new conditions also a continued lateral thrust toward the left is necessary in order to compensate for the unbalanced power thrust.

Hence the floating rudder will rotate so that it weather cocks into the relative air stream from the new direction 1 degree further in order to maintain the lateral thrust toward the left. Where the gust is a 4-degree gust as in the example suggested, the sum of the two angles will therefore be 5 degrees. Since the airplane is initially crabbed 1 degree toward the left producing a 1-degree impingement of the relative air stream coming from the normal direction on the fin 15, the 4-degree shift in direction of the relative air stream will result in the air impinging upon the fin 15 at 5 degrees, thus creating a corresponding lateral thrust on the vertical fin toward the right. This will counter-balance the effect of the gust upon the forward part of the fuselage and, except for the momentary adjustment, the airplane will still continue to crab 1 degree toward the left to counter-balance the unbalanced power thrust.

Should the the gust continue, however, the airplane as a whole will take a new direction 4 degrees toward the left of the initial position until the gust ceases, although pointing slightly toward the right due to the 1-degree crab. Upon cessation of the gust the same recovery takes place as was described in connection with Figure 6, the only difference being that the angle of the tab 26 with respect to the floating rudder 24 will remain set at 1 degree in order to trim against the unsymmetrical power thrust which is assumed to continue.

Operating mechanism for floating rudder

A characteristic arrangement of operating devices for operating both the control and trim of the floating rudder in company with operation of the floating forward lifting surfaces or wings is illustrated in Figure 9. As there shown the floating rudder 24 includes a torque tube 40 which is secured to bulkheads 41 and 42 forming part of the structure of the floating rudder. The torque tube is adapted to extend through bearings 43 and 44 mounted upon a supporting plate 45 having brackets 46 by means of which it may be attached to the frame of the fuselage, not shown, but in substantially the location illustrated in Figures 1, 2 and 3.

In order to operate the control tab 26, there illustrated as being pivotally supported upon a pivot pin 47 at the trailing edge of the floating rudder 24, connections are provided extending from the control tab to a pair of left and right rudder pedals 48 and 49, these for convenience being shown as rotatably supported upon a shaft 50. Instead of hydraulic controls or other more involved connections, for convenience in disclosing the invention there are shown connections comprising cables and pulleys.

In the example chosen a cable 51 from a bracket 52 of the left pedal 48 extends over appropriate pulleys to a position where it enters within the interior of the torque tube 40 and thence passes over a pulley 53 from which it extends to an anchor pin 54 located on the left forward side of the control tab 26. A cable 55 extends from an appropriate bracket 56 of the right pedal 49 over appropriate pulleys to a point where the cable 55 also passes through the interior of the torque tube 40, thence over a pulley 57 to an anchor pin 58 on the opposite side of the control tab. A rudder tie cable 59 connects one rudder pedal with the other to complete the cable circuit so that the pedals are held in forward position. As the cables 51 and 55 are positioned in Figure 9 when the left rudder pedal 48 is depressed or pushed forwardly it exerts tension upon the cable 51 which rotates the control tab 26 clockwise as viewed from above in Figure 9. This is the same relative position as the control tab 26 has in Figure 5. Rotation of the control tab making an angle in the direction illustrated with respect to the floating rudder 24 causes the air stream to rotate the floating rudder slightly in a counter-clockwise direction as viewed from above so that the force of the air stream impinges upon the right vertical face of the floating rudder causing a lateral thrust toward the left. This is the thrust which turns the airplane directionally in flight toward the left as illustrated in Figure 5. When the left rudder pedal 48 is depressed it will draw the right rudder pedal 49 rearwardly releasing upon the cable 55 which is attached to the opposite side of the control tab 26.

On the contrary, when it is desired to turn the airplane toward the right the right rudder pedal is depressed which exerts tension on the cable 55 while at the same time releasing tension on the cable 51, thereby rotating the control tab 26 counter-clockwise as viewed from above which brings about a clockwise rotation of the floating rudder under those circumstances. The control tab is automatically returnable by force of the air stream whenever pressure upon the rudder pedals is released and the tab and rudder become balanced in neutral position.

The trim tab 25, mounted upon a pin 60 at the trailing edge of the rudder in longitudinal alignment with the control tab is arranged so that it is not returnable automatically but only by manual operation.

The trim tab 25 of the floating rudder is operated by means of a directional control crank 62 rotated about a pin 63 in a vertically extending position at the side of the cockpit. To rotate the trim tab 25 for a trim toward the left, such as is illustrated in Figure 5, the trim crank 62 is rotated in a counter-clockwise direction. Rotation in this direction exerts tension upon an end 64 of a cable extending around and fastened to the trim crank, the cable in turn being reaved over suitably positioned pulleys so as to enter and pass through the torque tube 40 to a location within the floating rudder, there to pass around an interiorly threaded nut 65. In the embodiment shown the nut is provided with right-hand threads and is threadably mounted upon a shaft 66 at one end. The other end of the shaft is attached by means of an anchor pin 67 to the trim tab 25.

When the rudder crank is rotated counter-clockwise, as viewed from above, tension on the end 64 of the cable rotates the nut 65 clockwise as viewed from the rear which tends to shift the shaft 66 from left to right, thereby rotating the trim tab 25 clockwise, as viewed from the top, which in turn causes the floating rudder 24 to shift by an angle of corresponding amount in a counter-clockwise direction as viewed from the top. The angular throw of the trim tab 25 may be limited, if desired, by location of stop nuts 68 and 69 on the shaft 66 which are adapted to abut against brackets 70 and 71 which in turn support the shaft 66.

Rotation of the direction control crank 62 in the opposite or clockwise direction produces tension upon the other end 72 of the connecting cable which in the arrangement shown passes around the nut 65 in the opposite direction and tension upon the end 72 of the cable causes the nut 65 to rotate in a counter-clockwise direction, as viewed from the rear. The result is to thread the nut 65 upon the shaft 66 from left to right, thus drawing the shaft 66 from right to left. This last-identified motion results in a rotation of the tab 25 counter-clockwise as viewed from the top. In turn the floating rudder 24 is turned clockwise as viewed from the top, thereby presenting the left side vertical surface toward the action of the air stream.

It will be obvious therefore that the trim tab 25 may be set for a desired trim entirely independently of the control tab which may continue to be operated in the normal manner. The control tab is not here set up for trimming purposes also as it could be by providing a conventional spring trim connection between the rudder pedals for example. Instead the control tab is used only for voluntary directional control.

In order to complete an understanding of the tie-up between the floating forward wing surfaces 13 and 14 in the example chosen the operating means for the wing surfaces is also illustrated schematically. As before described, to control the position and operation of the floating wing surfaces 13 and 14, it is necessary to control only the angular position of control tabs 22' on the floating wings. Adjustment of these control tabs 22' results in a vertical or longitudinal control for the airplane. Trim tabs have been omitted from Figure 9 in the interest of simplifying the description, the control tabs only being shown.

In the example chosen the torque tube assemblies 31 include bearings 74 in a suitable framework 79 secured to the structure of the airplane. A tubular brace 73 may be employed to reinforce the torque tubes and through which connections may extend.

The vertical or longitudinal control is exercised by operation of a control column 75 mounted upon a shaft 76 so that it can be rocked forwardly and backwardly. By means of connections extending through the wings to the control tabs 22', similar to the connections to the control tab 26 but omitted for the purpose of clarity, a pulling of the control column 75 upper end rearwardly exerts tension upon cables 77 and 77' which lifts or elevates the position of the control tabs 22' of both floating wings 13 and 14. This increases the angle of attack of the floating wings 13 and 14 a corresponding amount, the result being to cause the airplane to ascend. Pushing the control column upper end forwardly creates a contrary rotation of the control tabs 22' by exerting tension on cables 78 and 78'. This rotates the tabs downwardly and decreases the angle of attack of the floating wings, causing the airplane to descend.

While not comprising an essential part of the novel floating rudder, operation of the main wing ailerons contributes to the maneuverability of the airplane as a whole. The main wing ailerons are moved by manipulation of a wheel 80 located upon a shaft 81 on the control column in turn carrying a pulley 82. A cable 83 extends around the pulley 82 and is fixed thereto. The cable 83 may be connected to the main wing ailerons in order that by manipulation of the wheel 80 in a conventional way the airplane may be rolled laterally toward the right or the left.

The floating vertical rudder just described will operate in a particularly efficient manner to rapidly and positively control the direction of flight of an airplane and particularly a tandem type airplane. Regardless of the speed of the airplane, because of the unrestricted rotation of the vertical rudder, there will be no tendency to throw the nose of the airplane out of line. The floating rudder adjusts itself in the relative air stream to a position determined by the angular adjustment of either the control tab or the trim tab or both, the action of one being adapted to augment or diminish action of the other, depending on their relative positions with respect to the rudder. As previously noted the free rotating feature of the floating rudder permits the airplane to stabilize itself directionally under changing wind conditions.

Automatic return of the control tab readily promotes efficient control in forcing the tab and consequently the floating rudder back to neutral position in the event that the rudder pedals are released by the pilot. On the other hand, the trim tab setting is maintained fixed without automatic return in order to hold the trim regardless of wind conditions outside. Voluntary manual control must be exercised in order to change the trim angle.

The floating rudder has an improved effect at virtually all speeds of the airplane and can be balanced in location and area so that it remains sufficiently small in size to be affected to a minimum extent by adverse wind conditions without in any way impairing its effectiveness as a rudder.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. An aircraft having an airborne body, a floating directional control surface extending substantially vertically relative to the aircraft on the forward side of the center of gravity of said aircraft, an effective keel area on the other side of the center of gravity on the fore and aft axis, said control surface comprising an airfoil having a leading edge and a trailing edge, a substantially vertically disposed rotatable support for the airfoil located between the leading edge and the aerodynamic center having an unrestricted rotational connection to the aircraft, a tab pivotally mounted on the trailing edge of the airfoil, and control means in the aircraft adapted to move the tab independently of the airfoil thereby to determine the orientation of the aircraft in a horizontal plane.

2. A tandem airplane having a fuselage and a wing section, a floating directional control surface extending vertically relative to the airplane and on the forward side of the center of gravity of said airplane, an effective keel area on the other side of the center of gravity on the fore and aft axis, said control surface comprising an airfoil having a leading edge and a trailing edge, a vertically disposed rotatable support for the airfoil located between the leading edge and the aerodynamic center having an unrestricted rotational connection to the airplane, a tab pivotally mounted on the trailing edge of the airfoil and control means in the airplane adapted to move the tab independently of the airfoil thereby to determine the orientation of the airplane in a horizontal plane.

3. A tandem airplane having a fuselage, a main wing section and vertical fin located aft of the center of gravity of said airplane, and a floating wing section forward of the center of gravity, a floating rudder located forward of the center of gravity extending vertically relative to the airplane, said rudder comprising an airfoil having a leading edge and a trailing edge, a vertically disposed rotatable support between the leading edge and the aerodynamic center of the airfoil having an unrestricted rotational connection to the airplane, a tab pivotally mounted on the trailing edge of the airfoil, and control means in the airplane connected to said tab adapted to move the tab independently of the airfoil thereby to determine the direction of flight of the airplane.

4. A tandem airplane having a fuselage, a main wing section and vertical fin aft of the center of gravity of said airplane, and a floating wing section forward of the center of gravity, a floating directional control surface extending vertically relative to the airplane and located on the airplane forward of the center of gravity, said control surface comprising an airfoil symmetrical on both lateral vertical surfaces having a leading edge and a trailing edge, a vertically disposed rotatable support for the floating directional control surface located intermediate said leading edge and the aerodynamic center and having an unrestricted rotational connection to the airplane, a tab pivotally mounted on the trailing edge of the airfoil, and directional control means in the pilot compartment having a connection extending through the rotatable support to said tab adapted to move the tab independently of the airfoil thereby to determine the direction of flight of the airplane.

5. A tandem airplane having a fuselage, a main wing section and vertical fin on the rearward side of the center of gravity of said airplane, a floating wing section on the other side of the center of gravity on the fore and aft axis, a floating rudder extending vertically relative to the airplane and located on the airplane in a forward direction remote from the center of gravity, said rudder comprising an airfoil having a leading edge and a trailing edge, a vertically disposed rotatable support for the rudder located between the leading edge and the aerodynamic center having an unrestricted rotational connection to the airplane, an automatically returnable tab pivotally mounted on the trailing edge of the airfoil, manually operable directional control pedals in the pilot compartment and connections extending through the rotatable support to said tab adapted to move the tab independently of the airfoil thereby to determine the direction of flight of the airplane.

6. A tandem airplane having a fuselage, a main wing section and vertical fin on the rearward side of the center of gravity of said airplane, and a floating wing section on the other side of the center of gravity on the fore and aft axis, a floating directional control surface extending vertically relative to the airplane and located on the airplane on the same forward side of the center of gravity as said floating wing section, said directional control surface comprising an airfoil having a leading edge and a trailing edge, a vertically disposed rotatable support for the airfoil intermediate said leading edge and the aerodynamic center having an unrestricted rotational connection to the airplane, a trim tab pivotally mounted on the trailing edge of the airfoil, a trim crank in the airplane and a nonautomatically returnable connection between the trim crank and said trim tab, said trim tab and the trim crank being operable thereby to determine a fixed amount of trim for the airplane in flight.

7. A tandem airplane having a fuselage and a main wing section, a floating rudder on the forward side of the center of gravity of said airplane extending vertically relative to the airplane an effective keel area on the other side of the center of gravity, said rudder comprising an airfoil having leading and trailing edges, a vertically disposed hollow rotatable support for the airfoil intermediate the leading edge and the aerodynamic center having an unrestricted rotational connection to the airplane, trim and control tabs in longitudinal alignment on the trailing edge of the floating rudder, a set of directional control devices and a trim control means in the airplane, connections from the control tab extending through the hollow rotatable support to the set of directional control devices, and a non-automatically returnable trim connection from the trim tab to the trim control means.

8. A tandem airplane having a fuselage, a main wing section and vertical fin on the rearward side of the center of gravity of said airplane, and a floating wing section on the other side of the center of gravity on the fore and aft axis having controllable tab means thereon, a floating rudder extending vertically relative to the airplane and located on the airplane on the same fore and aft side of the center of gravity as said floating wing section, said rudder comprising an airfoil having leading and trailing edges, a vertically disposed rotatable support for the airfoil intermediate the leading edge and the aerodynamic center having an unrestricted rotational connection to the airplane, trim and control tabs in longitudinal alignment on the trailing edge of the floating rudder, a set of interconnected rudder pedals in the airplane and automatically returnable connections from the control tab to the rudder pedals, a directional trim crank on the airplane and a fixed position trim connection from the trim tab to the directional trim crank.

9. A tandem airplane having a fuselage, a main wing section and a vertical fin aft of the center of gravity of said airplane and a floating wing section forward of the center of gravity having control tabs thereon, a floating rudder extending vertically upward relative to the airplane and located on the fuselage forward of the center of gravity, said rudder comprising an airfoil having leading and trailing edges and a vertically disposed hollow rotatable support intermediate the leading edge and the aerodynamic center, said support forming an unrestricted rotational connection to the fuselage, trim and control tabs in longitudinal alignment on the trailing edge with the trim tab outermost, a set of interconnected rudder pedals in the airplane and automatically returnable connections from the control tab extending through the hollow rotatable support to the rudder pedals, a directional trim crank on the airplane and a fixed position trim connection from the trim tab to the directional trim crank, a control column and connections from the control column to the control tabs only on the floating wings adapted to control the airplane in a vertical direction during all positions of the floating rudder and the trim tab thereon.

10. An airplane having a fuselage, a wing section and an empennage means, said empennage means comprising a freely rotating rudder pivotally mounted on the airplane in vertical position on the forward side of the center of gravity of said airplane and a vertical fin on the airplane on the other side of the center of gravity on the fore and aft axis, control and trim tabs pivotally mounted in axial alignment on the trailing edge of said freely rotating rudder, a directional trim control device and a rudder control device in the airplane and connections independent of said freely rotating rudder from the trim and control tabs respectively to the directional trim control device and the rudder control device.

11. An airplane having a fuselage, a main airfoil section, a second airfoil section adapted to control the vertical position of the airplane, a fixed vertical fin on the airplane on the aft side of the center of gravity of said airplane on the fore and aft axis and a freely rotating rudder pivotally mounted on the airplane in vertical position on the other side of the center of gravity on the fore and aft axis, control and trim tabs on the trailing edge of said freely rotating rudder, a directional trim control device and a rudder control device in the airplane and connections independent of the freely rotating rudder from the trim and control tabs respectively to the directional trim control device and the rudder control device.

12. In an airplane having a fuselage, a main airfoil section on the rear side of the center of gravity of said airplane, a second airfoil section on the forward side of the center of gravity adapted to control the vertical position of the airplane, a fixed vertical fin on the fuselage at the rearward side of the center of gravity and a freely rotating rudder pivotally mounted in vertical position on the fuselage on the forward side of the center of gravity, control and trim tabs on the trailing edge of said freely rotating rudder, a direction trim control device and a rudder control device in the fuselage and connections independent of the freely rotating rudder from the trim and control tabs respectively to the directional trim control device and the rudder control device.

References Cited in the file of this patent

UNITED STATES PATENTS

| Number | Name | Date |
|---|---|---|
| 1,661,114 | Flettner | Feb. 28, 1928 |
| 1,827,304 | Thurston | Oct. 31, 1931 |
| 1,890,059 | Lake | Dec. 6, 1932 |
| 2,003,206 | Lewis | May 28, 1935 |
| 2,156,994 | Lachmann | May 2, 1939 |
| 2,191,842 | Back | Feb. 27, 1940 |
| 2,369,832 | Klose | Feb. 20, 1945 |
| 2,401,790 | Noyes, Jr., et al. | June 11, 1946 |
| 2,430,793 | Wells | Nov. 11, 1947 |
| 2,601,962 | Douglas | July 1, 1952 |

FOREIGN PATENTS

| Number | Country | Date |
|---|---|---|
| 415,631 | France | July 19, 1910 |